US006709281B2

(12) United States Patent
Shishikura et al.

(10) Patent No.: US 6,709,281 B2
(45) Date of Patent: Mar. 23, 2004

(54) WRITE PROTECT SWITCH FOR CARD CONNECTOR (75) Inventors: Seiji Shishikura, Chiba (JP); Takahiro Sakamoto, Hirakata (JP)

(73) Assignees: Yamaichi Electronics Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/890,950
(22) PCT Filed: Dec. 5, 2000
(86) PCT No.: PCT/JP00/08607
§ 371 (c)(1),
(2), (4) Date: Nov. 9, 2001
(87) PCT Pub. No.: WO01/43237
PCT Pub. Date: Jun. 14, 2001

(65) Prior Publication Data
US 2002/0137380 A1 Sep. 26, 2002

(30) Foreign Application Priority Data
Dec. 9, 1999 (JP) .......................... 11-350355

(51) Int. Cl.⁷ .............................. H01R 29/00
(52) U.S. Cl. .................... 439/188; 200/51.1
(58) Field of Search .................. 439/188, 489, 439/630; 200/51.09, 51.1

(56) References Cited

U.S. PATENT DOCUMENTS

| 3,283,107 A | 11/1996 | Anson ...................... 200/574 |
| 5,820,391 A | 10/1998 | Delprete et al. ............. 439/91 |
| 5,911,587 A | 6/1999 | Vermeersch ............... 439/188 |
| 6,004,155 A | 12/1999 | Wu ........................... 439/489 |
| 6,015,311 A | 1/2000 | Benjamin et al. .......... 439/267 |
| 6,039,599 A | 3/2000 | Benjamin et al. .......... 439/489 |
| 6,059,592 A | 5/2000 | Inadama .................... 439/188 |
| 6,073,853 A | 6/2000 | Odic .......................... 235/486 |
| 6,099,335 A | 8/2000 | Chang ....................... 439/188 |
| 6,126,464 A | 10/2000 | Chang ....................... 439/188 |
| 6,129,571 A | 10/2000 | Ikemoto ..................... 439/260 |
| 6,399,906 B1 | 6/2002 | Sato et al. ................ 200/61.59 |

FOREIGN PATENT DOCUMENTS

| EP | 0 284 431 A2 | 9/1988 |
| EP | 0 669 590 A2 | 8/1995 |
| EP | 0 908 981 A2 | 4/1999 |

(List continued on next page.)

OTHER PUBLICATIONS

U.S. patent application Ser. No. 09/869,756, T. Takada et al., filed Oct. 15, 2001.
U.S. patent application Ser. No. 09/889,007, K. Abe, filed Oct. 29, 2001.
International Search Report Application No. PCT/JP00/07760 dated Jan. 26, 2001.
International Search Report Application No. PCT/JP00/07761 dated Jan. 26, 2001.

(List continued on next page.)

Primary Examiner—Ross Gushi
(74) Attorney, Agent, or Firm—Finnegan, Henderson, Farabow, Garrett & Dunner, LLP (57) ABSTRACT The write protect switch SW comprises a first piece of metal (50) formed from a stationary metal piece and a second piece of metal (40). The touching portion (46) of the second piece of metal (40) that comes in contact with one of the slide positions of the write protect button (3) in the recess (2) is situated generally at the center position between the contact portion (45) and the holding portion (42) of the second piece of metal (40) or on the holding portion (42) side of the center position. This arrangement ensures a reliable, stable separably connecting operation of the two pieces of metal (40, 50) and provides a necessary contact pressure between them so that the position of the write protect button (3) can be detected accurately and reliably.

2 Claims, 6 Drawing Sheets

FOREIGN PATENT DOCUMENTS

| | | |
|---|---|---|
| JP | 5-96941 | 12/1993 |
| JP | 08166906 A | 6/1996 |
| JP | 10144422 | 5/1998 |
| JP | 10144422 A | 5/1998 |
| JP | 10187896 | 7/1998 |
| JP | 10255012 | 9/1998 |
| JP | 10255910 A | 9/1998 |
| JP | 11149956 A | 6/1999 |
| JP | 11149956 | 6/1999 |
| JP | 01 35331 | 5/2001 |
| WO | WO 01 35331 | 5/2001 |

OTHER PUBLICATIONS

European Search Report Application No. 00979102.1–2214–JP0008607 dated Apr. 22, 2002.

PCT Search Report No. PCT/JP00/07760, dated Feb. 6, 2001.

WRITE PROTECT SWITCH FOR CARD CONNECTOR

TECHNICAL FILED

The present invention relates to a card connector mounted on electronic devices, such as cellular phones, telephones, PDA (personal digital assistants), portable audio devices and digital cameras, and more specifically to a write protect switch for detecting a position of a write protect button on an IC card.

BACKGROUND ART

In electronic devices such as cellular phones, telephones, PDA and digital cameras, addition of a variety of functions and identification of a user are made by inserting an IC card with a built-in IC, such as a SIM (subscriber identity module) card, an MMC (multimedia card) (trade mark), a smart media (trade mark) and an SD (secure digital or super density) card.

The IC card of this kind normally has some means for inhibiting the write operation in order to protect information stored in its internal memory. A means is also provided to cancel the write protection to allow information to be written from an electronic device. into the memory of the IC card when the card holder so desires.

Various kinds of write protect methods have been proposed. One such means is a mode of the write protect button that can slide between two positions, as in a floppy disk. The mode of the write protect button is considered advantageous because it can be used repetitively and the construction is simple.

In such a slide button system, it is no secret that the card is provided with a write protect button that can slide between two positions and the electronic device is provided with an electric circuit which is set to a write inhibit state when the write protect button is situated at one position and to a write-enable state when it is situated at another position.

As a sensor structure for detecting the position of the write protect button, a optical sensor structure may be considered. The optical sensor structure, however, has drawbacks that a sufficient detection precision cannot be expected as the IC card becomes thinner and smaller and that the installation of a optical sensor can hinder promotion in downsizing and cost-reduction.

Figure 6A:
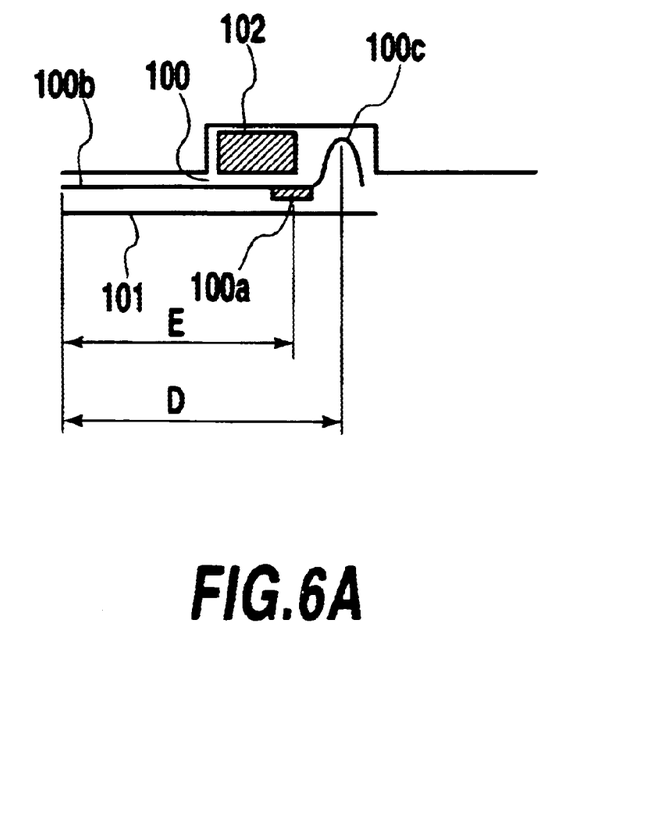
Figure 6B:
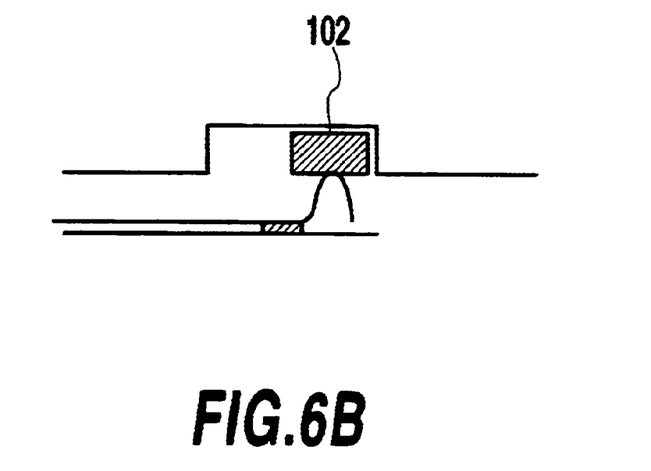

FIG. 6A and FIG. 6B show the construction of a conventional write protect switch using a contact leaf spring.

In this conventional construction, a switch structure having a contact leaf spring 100 with a contact portion 100a and a stationary leaf spring 101, detects the position of a write protect button 102. In this switch structure, when the button 102 is situated at one position, the leaf springs 100, the stationary leaf 101 are parted (FIG. 6A); and when the button 102 is at the other position, a contact portion 100a of the contact leaf 100, stationary leaf 101 are connected (FIG. 6B).

In such a switch structure, the displacement of the contact leaf 100 basically depends on the height (thickness) of the button 102. The connector and card have variations in dimensional error and there are parts and assembly tolerances. Thus, the actual displacement of the contact leaf spring 100 is obtained by subtracting the above-described errors from the thickness of the button 102.

In many cases, the displacement of the contact leaf 100 is often not enough for button 102 detection.

Further, in the conventional technique described above, the elastically deflecting contact leaf spring 100 is constructed such that the difference between a length D and a length E is small, the length D being measured from a fixed portion 100b, which fixedly supports the contact leaf spring like a cantilever, to the engagement portion 100c that engages the write protect button 102, the length E being measured from the fixed portion 100b to the contact portion 100a. Thus, the deflection obtained at the contact portion 100a is not greater than a deflection produced at the engagement portion 100c. This is combined with the above-described problem of error and assembly tolerances, making it impossible to secure a sufficient contact pressure of the contact portion 100a for making an electric connection. In the worst case, it is a problem since the position of the write protect button 102 may not be able to be detected stably and accurately.

The present invention has been accomplished under these circumstances. It is an object of the invention to provide a write protect switch for a card connector that can perform reliable and stable separably connecting operations of metal leaf springs and which can provide a necessary contact pressure of the contact portion for reliable electric connection between the two metal leaf springs.

DISCLOSURE OF INVENTION

According to one aspect, the present invention provides a write protect switch in a card connector for detecting a slide position of a write protect button on a card, wherein when the card having the write protect button of a predetermined height, which is slidable between two positions in a recess formed in an outer surface of the card, is loaded into the card connector, the write protect switch detects the slide position of the write protect button on the card according to an separably connecting of a pair of pieces of metal, the write protect switch comprising: a first piece of metal made from a stationary piece of metal; and a cantilevered second piece of metal having a holding portion at one end side thereof and a contact portion at the other end side thereof, the holding portion being rigidly held in a housing of the card connector, the contact portion being connected or separated with the first piece of metal, the second piece of metal also having a projecting touching portion between the holding portion and the contact portion, the projecting touching portion being adapted to touching one of the slide position of the write protect button in the recess; wherein the projecting touching portion is situated generally at a center position between the contact portion and the holding portion or on the holding portion side of the center position.

In the cantilevered metal leaf spring, one of the pieces of metal making up the write protect switch, the projecting touching portion that comes in contact with the write protect button is situated generally at the center position between the contact portion and the holding portion of the metal leaf spring, i.e., at the center position between the ends of the metal leaf spring, or on the holding portion side of the center position. With this write protect switch, therefore, the two metal pieces can be connected or separated by a displacement of the contact portion which is at least two times the height of the write protect button.

Thus, if various error factors exist, this invention enables a reliable, stable separably connecting of the two pieces of metal and provides an enough contact pressure to make electrical connection.

BRIEF DESCRIPTION OF DRAWINGS

FIG. 6A and FIG. 6B are schematic diagrams showing a conventional technique, with FIG. 6A representing a state when the write protect switch is OFF and FIG. 6B representing a state when the write protect switch is ON.

BEST MODE FOR CARRYING OUT THE INVENTION

Now, embodiments of this invention will be described in detail by referring to the accompanying drawings.

Figure 1:
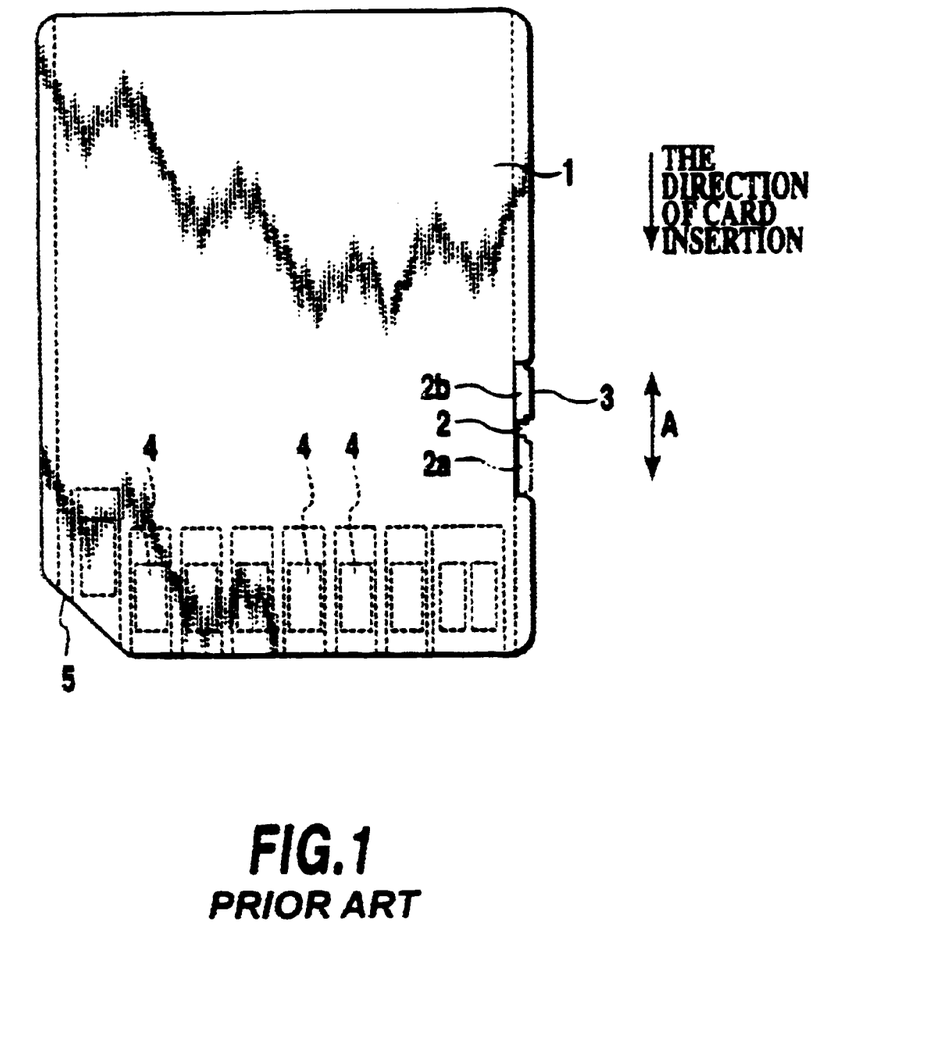
FIG. 1 is a plan view showing an example of an IC card to be inserted into a card connector of this invention.

FIG. 1 is a plan view of an example of IC card to be loaded into the card connector of this invention.

The IC card 1 has a notch(recess) 2 formed at one side, in which a write protect button 3 is arranged slidable in a card insertion and remove direction (direction of arrow A). The write protect button 3 can be slid to one of two positions: a protect-on position (write inhibit position) indicated by a solid line and a protect-off position (write enable position) indicated by a chain doubled-dashed line.

When the button 3 is set to a rear side portion 2b in the recess 2, the IC card 1 is write inhibited. When the button 3 is set to a front side portion 2a in the recess 2, the IC card 1 is write-enabled. The back surface of the card 1 is provided with a plurality of contact pads 4 indicated by dashed lines which are designed to make contact with contact terminals (not shown in FIG. 1) on the card connector side, including a power supply terminals and signal terminals. The IC card 1 has a notch portion 5 at one front corner for preventing a possible erroneous insertion.

Figure 2:
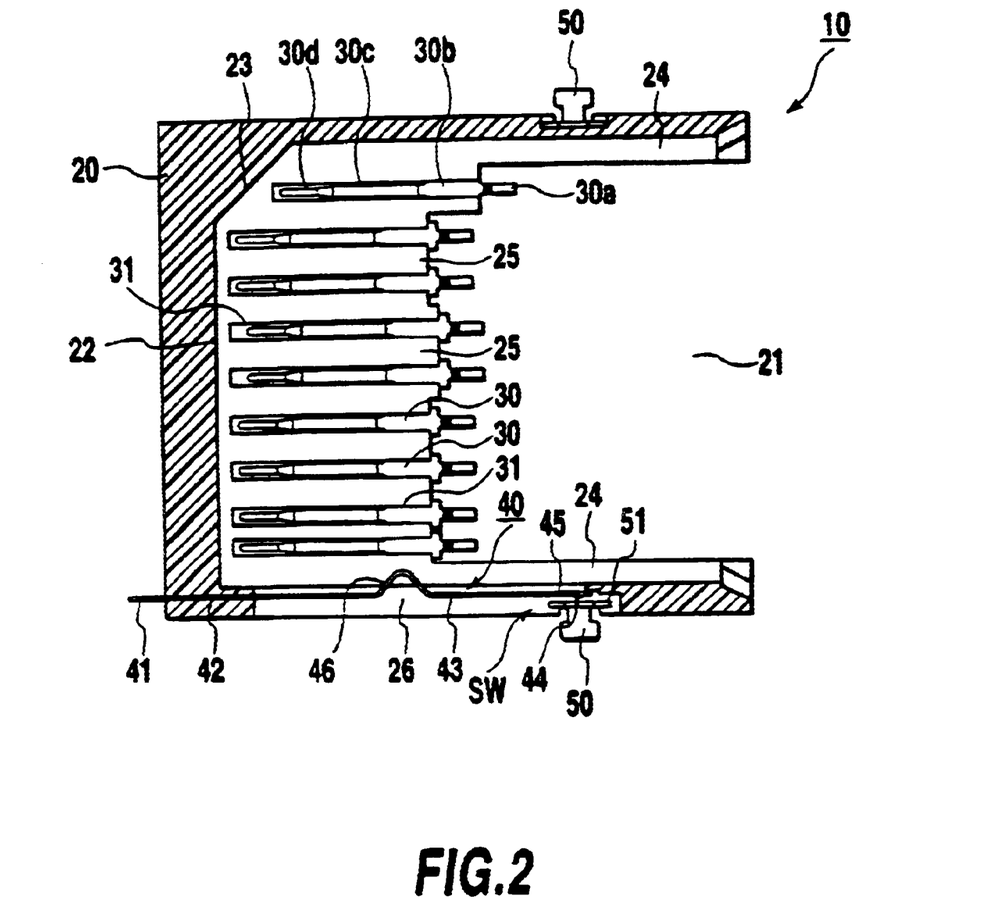
FIG. 2 is a horizontal cross section showing an internal structure of the card connector when the card is unloaded.
Figure 3:
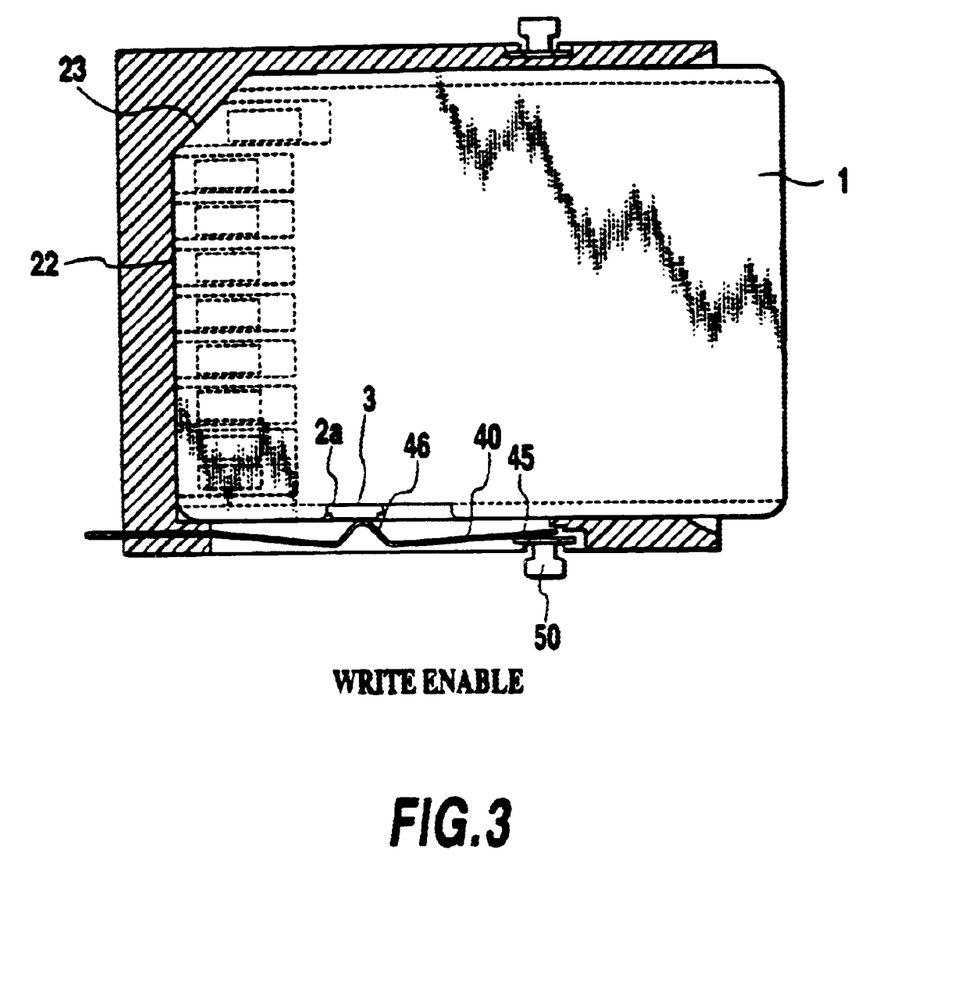
FIG. 3 is a horizontal cross section showing the internal structure of the card connector when a write-enabled card is inserted.
Figure 4:
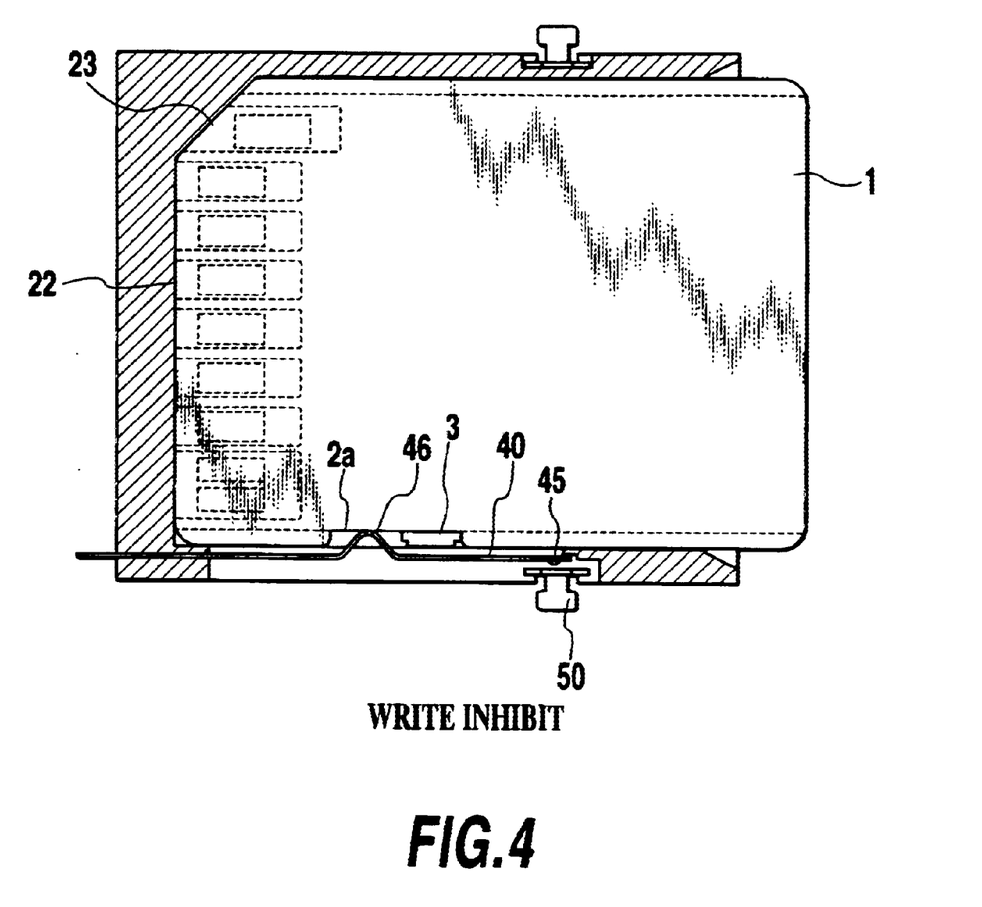
FIG. 4 is a horizontal cross section showing the internal structure of the card connector when a write inhibited card is inserted.

FIGS. 2–4 show a cross-sectional structure of the card connector 10 that receives an IC card 1. FIG. 2 represents a state when the card 1 is not yet loaded; and FIG. 3 and FIG. 4 represent states when the card 1 is loaded. In FIG. 3 the write protect button 3 is at the write enable position. In FIG. 4 the write protect button 3 is at the write inhibit position.

The card connector 10 shown in FIGS. 2–4 is mounted on electronic devices, such as cellular phones, PDA, portable audio devices and digital cameras.

The card connector 10 has an integrally molded connector housing 20 made of an insulating material such as resin. The connector housing 20 is secured to a printed circuit board by a pair of fixing metal 50 at the left and right side.

The IC card 1 is inserted into the card connector 10 through a card insertion opening 21 formed at the front of the connector housing 20.

The connector housing 20, as shown in FIG. 2, is provided with a abutment wall 22 against which the inserted IC card 1 is pushed. At one corner of the abutment wall 22, the housing 22 is provided with a projecting corner wall 23 that the notch portion 5 of the IC card 1 is applied.

The IC card 1 is supported at its both side edges by a pair of guide grooves 24 formed in both inner side walls of the connector housing 20 and is guided in the insertion and remove direction. A base plate 25 that forms a lower wall of the connector housing 20 has a plurality of press-fit grooves 31 in which a plurality of cantilevered contact terminals 30 are positioned and press-fitted.

Each of contact terminals 30 include power supply terminals and signal terminals. Each of contact terminals 30 have a terminal portion 30a soldered joint to a contact pad or the like on the printed circuit board of the electronic device, a stationary portion 30b press-fitted in the press-fit groove 31, and a contact leaf portion 30c elastically deflected to engage the contact pad 4 of the IC card 1. The contactleaf portion 30c has a contact portion 30d protruding in arc.

These contact terminals 30 make electrical connection between the IC card 1 and the electronic device and their elastic force provides an appropriate card retaining force when the card is loaded.

One side wall portion 26 of the connector housing 20 is provided with a write protect switch SW comprising a pair of pieces of metal 40, 50. This write protect switch SW detects the position of the write protect button 3 of the IC card 1.

One of the piece of metal, a long metal leaf spring 40, has a terminal portion 41 soldered to the contact pad of the printed circuit board, a stationary portion (holding portion) 42 press-fitted in the connector housing 20, a leaf portion 43 extending along the side of the inserted card 1, and a contact portion 45 provided with a raised contact projection 44. The stationary portion 42 is rigidly secured thereby supporting the metal leaf spring 40 like a cantilever.

Further, the spring portion 43 of the metal leaf spring 40 has an touching portion (projecting portion) 46 projecting at generally the center thereof to come in contact with the write protect button 3 or the bottom of the recess 2 of the card 1.

The other piece of metal 50 is a stationary metal terminal having a contact portion 51 with which the contact projection 44 of the mating the piece of metal 40 is separably connected. In this case, one metal terminal forming the write protect switch SW is also used as one of the fixing metal 50 for securing the connector housing 20 to the printed circuit board.

As shown in FIG. 3, when the write protect button 3 is at the write enable position, the projecting portion 46 of the metal leaf spring 40 comes in contact with the write protect button 3 slid to the front side portion 2a of the recess 2 of the IC card 1. At this time, the contact portion 45 of the metal leaf spring 40 comes in contact with the stationary metal piece 50, turning on the switch SW.

When on the other hand the write protect button 3 is at the write inhibit position as shown in FIG. 4, the projecting engagement portion 46 of the metal leaf spring 40 engages the bottom surface of the front side portion 2a of the recess 2 of the card 1. At this time, the contact portion 45 of the metal leaf spring 40 is parted from the stationary metal piece 50, turning off the switch SW.

In this switch structure because the contact portion 45 of one piece of metal 40 comes into or out of contact with the stationary metal piece 50 according to the position of the write protect button 3, it is possible to determine at which position, the write inhibit position or the write enable position, the write protect button 3 of the IC card 1 is situated by electrically detecting the connection or disconnection of these metal pieces 40, 50 by an electric circuit connected to the terminal portions of these metal pieces 40, 50.

In this embodiment, the projecting portion 46 of the metal leaf spring 40 or elastically displaceable metal piece that comes in contact with either the write protect button 3 or the bottom of the notch(recess) 2 is situated at generally the center position between the contact portion 45 and the stationary portion 42 or on the stationary portion 42 side of this center position. In other words, as shown in FIG. 5, a length L1 from the stationary portion 42 to the contact portion 45 is set to more than two times a distance L2 from the stationary portion 42 to the projecting portion 46.

Figure 5:
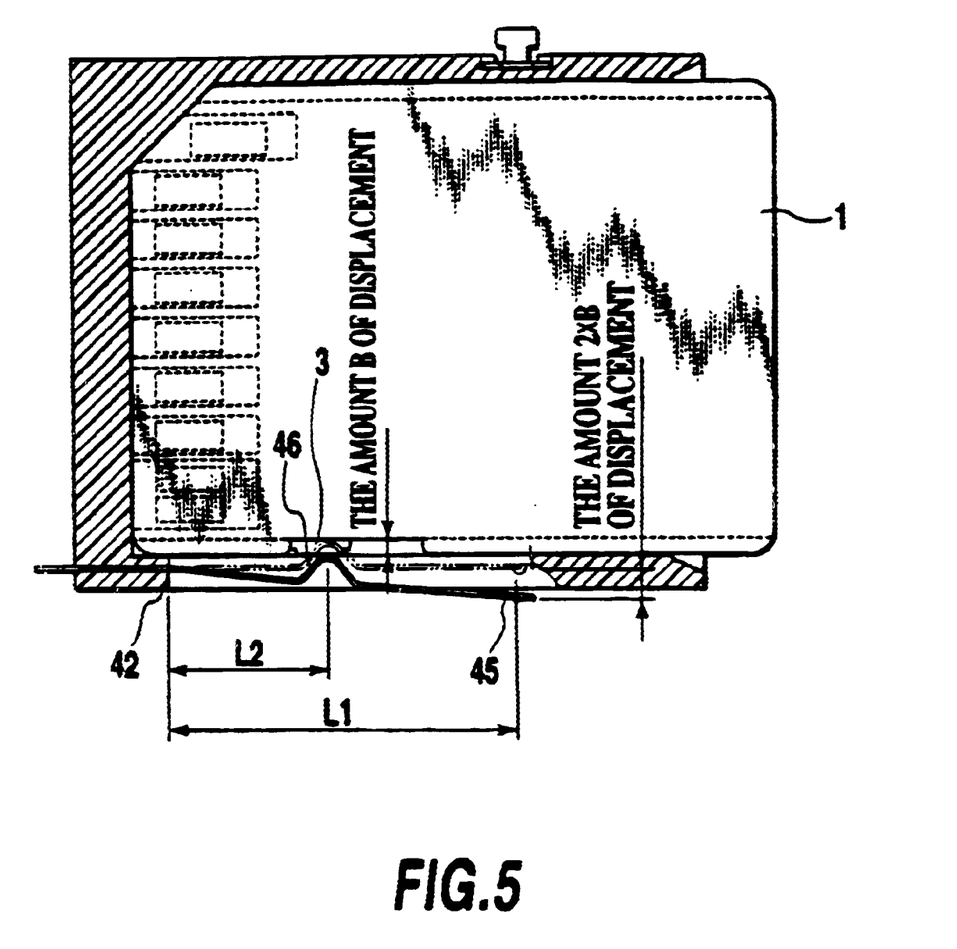
FIG. 5 is a horizontal cross section showing the working principle of the write protect switch.

Therefore, in this embodiment, when the projecting portion 46 is elastically displaced by an amount B according to the position of the write protect button 3, the contact portion 45 at the free end of the metal leaf spring 40 is reliably displaced by more than two times the amount B (2×amount B), as shown in FIG. 5.

In this switch structure, as described above, the contact portion 45 of the metal leaf spring 40 can be displaced by more than two times the height or thickness of the write protect button 3. By this enlarged displacement the mating metal pieces 40, 50 can be connected or separated.

Hence, even when there are various error factors, including dimensional tolerances of the card and of the card support portion of the connector and dimensional variations during manufacture, this switch structure can assure reliable and stable connection and separateness of the mating pieces of metal 40,50 and provide a sufficient contact pressure to make electrical connect with each other. This in turn enables a precise, reliable detection at all times of the position of the write protect button 3, reliably preventing an erroneous operation of writing into the write inhibited IC card 1.

While in the embodiment described above the button position indicated by a solid line in FIG. 1 represents the write inhibit position and the position indicated by a chain doubled-dashed line represents the write enable position, they may be reversed, i.e., the button position indicated by a solid line of FIG. 1 may be used as the write enable position and the position indicated by a chain doubled-dashed line as the write inhibit position.

Further, although in the embodiment above one of the mating pieces of meta 150, of the write protect switch SW is also used as the fixing metal to secure the card connector 10 to the printed circuit board, the piece of metal 50 and the fixing metal may be formed as separate components.

Further, although in the embodiment above the stationary portion 42 of the metal leaf spring 40 is arranged on the front end side of the inserted IC card 1 (on the far side of the connector), the direction of the metal leaf spring 40 may be reversed by a 180-degree angle to put the stationary portion 42 on the rear end side of the IC card 1 (on the near side of the connector).

Further, while in the embodiment above the projecting engagement portion 46 of the metal leaf spring 40 is made to come in contact with the bottom of the front side portion 2a of the recess 2 of the IC card 1, it may be made to come in contact with the bottom of the rear side portion 2b.

Further, while in the embodiment above the write protect switch SW is arranged in the side wall portion of the connector housing 20 to match the card having the write protect button 3 at its side, when the card has the write protect button at the front, on the surface or on the back of the card, the position of the write protect switch SW need only be changed accordingly.

INDUSTRIAL APPLICABILITY

As described above, one of the pieces of metal making up the write protect switch, namely the cantilevered metal leaf spring, is constructed such that the touching portion touching the write protect button is situated generally at the center position between the contact portion and the holding portion of the metal leaf spring, i.e., at the center position between the ends of the metal leaf spring, or on the holding portion side of this center position. This arrangement displaces the contact portion of the metal leaf spring by at least two times the height or thickness of the write protect button when the pair of pieces of metal making up the write protect button are connected or separated each other.

Therefore, in a small or very small card that cannot provide an enough space for the height of the button, even when various error factors are produced, the switch structure described above can ensure a reliable connection or separateness operation of the contact leaf and provide a sufficient contact pressure to make an electrical contact. It is therefore possible to precisely and reliably detect the position of the write protect button at all times, preventing a possible error of writing data into a write inhibited card.

What is claimed is:

1. A write protect switch in a card connector for detecting a slide position of a write protect button on a card, wherein when said card having said write protect button of a predetermined height, which is slidable between two positions in a recess formed in an outer surface of said card, is loaded into said card connector, the write protect switch detects the slide position of the write protect button on the card according to an connection or separateness of a pair of pieces of metal, said write protect switch comprising:

a first piece of metal made from a stationary piece of metal wherein said first piece of metal also serves as a fixing metal for fixing a housing of said card connector to a printed circuit board; and     a cantilevered second piece of metal having a holding portion at one end side thereof and a contact portion at the other end side thereof, said holding portion being rigidly held in a housing of said card connector, said contact portion being separably connected with said first piece of metal, said cantilevered second piece of metal also having a projecting portion between said holding portion and said contact portion, said projecting portion being adapted to come in contact with the recess;

wherein said projecting portion is situated generally at a center position between said contact portion and said holding portion or on said holding portion side of said center position.

2. A write protect switch in a card connector according to claim 1, wherein said write protect switch is arranged in a side wall portion of the connector housing.

\* \* \* \* \*